UNITED STATES PATENT OFFICE.

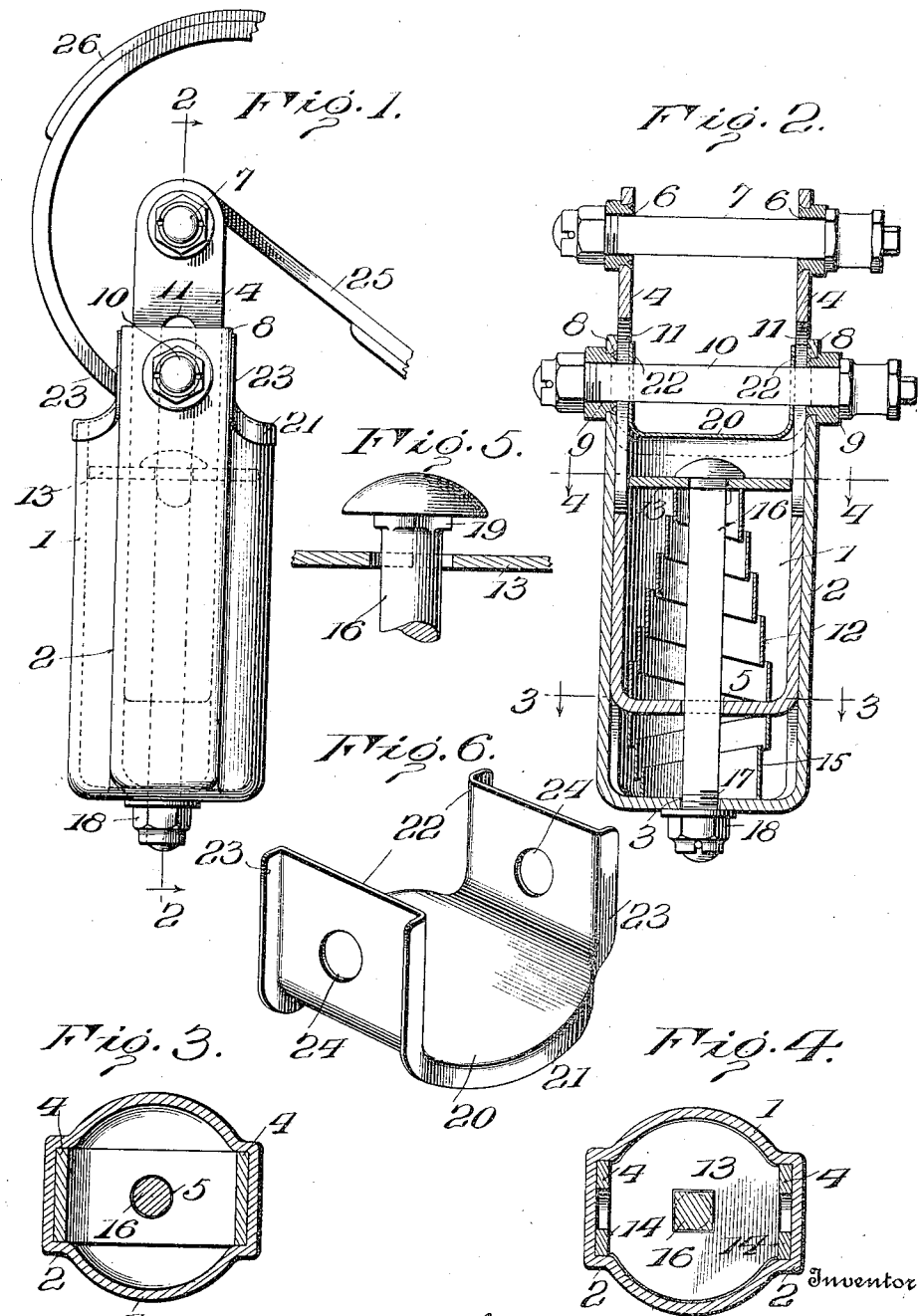

JOSEPH W. JONES, OF NEW ROCHELLE, NEW YORK.

SHOCK-ABSORBER.

1,140,596.

Specification of Letters Patent. Patented May 25, 1915.

Application filed March 11, 1915. Serial No. 13,678.

*To all whom it may concern:*

Be it known that I, JOSEPH W. JONES, a resident of, and whose post-office address is, New Rochelle, county of Westchester, State of New York, have invented a new and useful Improvement in Shock-Absorbers, which invention is fully set forth in the following specification.

This invention relates to shock-absorbing suspension devices primarily intended for automobiles, but capable of use with other vehicles, and has for its object the production of a simple, reliable and efficient shock-absorber.

Preferably, in the present invention the shock-absorber is combined with the other elements so as to suspend the body of an automobile or the like between the upper and lower springs, to avoid shock or jar both when the vehicle is bounced upward and when it drops back again, though such arrangement is not essential.

Among the objects secured by the present invention are a simple and effective means of adjusting the tension of the shock-absorber, and means for excluding dirt and other foreign material from the interior of the shock-absorbing casing.

Other objects are to provide a shock-absorber which can be readily applied to any of the ordinary types of automobiles, and which shall be compact, inexpensive to manufacture, easy to assemble, and durable in service.

With these objects in view, the invention consists in the combination and arrangement of elements hereinafter set forth.

The inventive idea is capable of receiving a variety of mechanical expressions, one of which is shown in the accompanying drawing, but it is to be understood that the drawings are for the purpose of illustration only, and are not designed to define the limits of the invention, reference being had to the appended claims for this purpose.

In said drawings,—Figure 1 is a side view of a preferred form of the new shock-absorber in place; Fig. 2 is a vertical central section on line 2—2 of Fig. 1, parts being shown in elevation; Fig. 3 is a horizontal section on the line 3—3 of Fig. 2, looking in the direction of the arrows; Fig. 4 is a transverse section on the line 4—4 of Fig. 2, looking in the direction of the arrows; Fig. 5 is an enlarged detail of the tension bolt and a section of the washer; and Fig. 6 is an enlarged view of the cover plate in perspective.

Referring to the drawings, in which like reference numerals indicate like parts throughout the several views, 1 is a tubular casing closed at its lower end and provided with two oppositely disposed grooves or guideways 2, 2, formed in the walls thereof, and having a central opening or perforation 3 in its bottom. Preferably, said casing 1 is struck up from sheet metal, thereby combining cheapness of construction with great strength.

Sliding vertically and fitting snugly in the grooves 2, 2, of the casing is a U-shaped stirrup 4, provided with a central perforation 5 in its bottom in alinement with the perforation 3 in the bottom of the casing, and having near the upper ends of the two legs of the stirrup openings or perforations 6, 6, for receiving a bolt 7.

The portions of the side wall of the casing in which the grooves 2, 2, are located are preferably extended upwardly above the top of the casing proper, forming ears 8, 8, each of which ears is provided with a perforation or opening 9, through which extends a bolt 10, said bolt also extending through longitudinal vertical slots 11, 11, formed in the U-shaped stirrup.

Resting within the stirrup and above the bottom thereof is a spring 12, preferably of convolute form, and on the top of said spring is arranged a washer 13, which is restrained from turning movement with relation to the casing and the stirrup by reason of oppositely disposed flat faces 14, 14, engaging the inner faces of the stirrup. If desired, a second convolute spring 15 is arranged below the stirrup and resting upon the bottom of the casing. The washer 13 is provided with a central opening in alinement with the openings in the bottom of the casing and the stirrup, and a bolt 16 is passed through the washer, the openings in the stirrup and casing, and through the spring or springs within the casing, until its lower threaded end 17 projects below the bottom of the casing, where it is engaged by a suitable nut 18, operating in conjunction with the usual lock nut, if desired.

Suitable means are provided for restraining the bolt from turning movement with relation to the washer. Any suitable means may be provided for this purpose, and as here shown, such means consists of an angularly formed shouldered portion 19 under the head of the bolt, the opening through the washer being correspondingly shaped. As here shown, the shouldered portion 19 has four flat faces engaging a similar number of flat faces in the opening of the washer. While the angular shouldered portion on the bolt and the angular opening through the washer afford efficient means for preventing relative turning movement between the bolt and washer, the same are designed merely as an illustration of any suitable engagement between these two parts and lock them together and prevent such relative turning movement.

For the purpose of excluding dirt and other foreign material from the interior of the casing, there is provided a cover 20 illustrated in perspective in Fig. 6. This cover consists of a main body portion having downwardly depending flanges 21 on two of its oppositely disposed sides, and upwardly projecting ears 22, 22, located between said downwardly depending flanges 21. Extending horizontally outward from said ears, and on each side thereof, are flanges 23, 23, the width of the ears and the distance between the flanges being such that when the cover is in position the flanges 23 will snugly embrace the upper portion of the stirrup and the ears 8, 8, on the casing, so as to effectively close the vertical joint between the two, while the downwardly depending flanges 21, 21, on the cover embrace the exterior of the walls of the casing between the ears, as will be clearly seen from an inspection of Figs. 1 and 2, where the cover is shown in position. The ears 22, 22, on the cover are provided with two oppositely disposed openings 24, 24, for the passage of the bolt 10, and it will be observed that when this bolt is in position, it passes through the openings in the upwardly projecting ears on the casing, the ears on the cover, and the vertical slots 11, 11, in the stirrup, so that said stirrup is free to have up-and-down motion with relation to said bolt 10.

When the shock-absorber is in position on the vehicle, the upper bolt 7 is engaged by the end of the spring 25 extending from the running gear, and the bolt 10 is engaged by the hanger member 26 extending from the car body or chassis.

When it is desired to adjust the tension of the spring 12 or of the two springs 12 and 15, if both springs are used, it may be quickly and effectively accomplished by loosening the locking nut and turning the nut 18 to either increase or decrease the tension on the spring, the bolt 16 being restrained from turning movement during this action by reason of its engagement with the washer 13, and the washer in turn is restrained from turning movement by reason of the engagement of its flat faces 14, 14, with the inner faces of the stirrup. This renders it possible to quickly and effectively adjust the tension of the shock-absorber from the exterior thereof and through the manipulation of a single nut.

Preferably, the casing, the stirrup, the washer and the cover are all struck up from sheet metal, which enables these parts to be quickly, cheaply and accurately formed, though it will be understood that the invention is not necessarily limited to the formation of these parts from sheet metal.

What is claimed is:—

1. In a shock-absorber of the character described, the combination of a tubular casing closed at its bottom and having two oppositely disposed grooves formed in its wall, a stirrup sliding vertically in said grooves with its ends projecting above said casing, a volute spring in said casing above and resting on the bottom of said stirrup, a washer resting on the top of said spring and having faces engaging the sides of said stirrup, and a bolt passing through an opening in said washer, means for restraining said bolt from turning in relation to said washer, said bolt also passing through said spring and the bottom of said stirrup and casing, a nut screw-threaded to the outer projecting end of said bolt, and bolts securing the casing and the stirrup to the body and the spring respectively of a vehicle.

2. In a shock-absorber of the character described, the combination of a tubular casing closed at its bottom and having two oppositely disposed grooves formed in its wall, a stirrup sliding vertically in said grooves with its ends projecting above said casing, a volute spring in said casing above and resting on the bottom of said stirrup, a washer resting on the top of said spring and having faces engaging the sides of said stirrup, and a bolt passing through an opening in said washer, engaging surfaces on the bolt and washer restraining the former from turning in relation to the latter, said bolt also passing through said spring and the bottom of said stirrup and casing, a nut screw-threaded to the outer projecting end of said bolt, and bolts securing the casing and the stirrup to the body and the spring respectively of a vehicle.

3. In a shock-absorber of the character described, the combination of a tubular casing closed at its bottom and having ears projecting upwardly from its walls, two oppositely disposed grooves formed in said casing, a stirrup sliding vertically in said grooves with its ends projecting above said casing, a volute spring in said casing above and resting on the bottom of said stirrup, a washer resting on the top of said spring and having faces engaging the sides of said stirrup, a bolt passing through an opening in said washer, means restraining said bolt from turning in relation to said washer, said bolt also passing through said spring and the bottom of said stirrup and casing, a nut screw-threaded to the outer projecting end of said bolt, and a cover plate for said casing provided with upwardly projecting flanged portions embracing said stirrup and closing the vertical joints between the latter and the ears of the casing.

4. In a shock-absorber of the character described, the combination of a tubular casing closed at its bottom and having ears projecting upwardly from its walls, and two oppositely disposed grooves formed in said casing and said projecting ears, a stirrup sliding vertically in said grooves with its ends projecting above said casing, a volute spring in said casing beneath said stirrup, a volute spring in said casing above and resting on the bottom of said stirrup, a washer resting on the top of said last-named spring, an angular opening through said washer, a bolt passing therethrough and having shoulders engaging the angular opening in said washer, said bolt also passing through said springs and the bottom of said stirrup and casing, and a nut screw-threaded to the outer projecting end of said bolt.

5. In a shock-absorber of the character described, the combination of a tubular casing closed at its bottom and having ears projecting upwardly from its walls, two oppositely disposed grooves formed in said casing and said projecting ears, a stirrup sliding vertically in said grooves with its ends projecting above said casing, a volute spring in said casing above and resting on the bottom of said stirrup, a washer resting on the top of said spring and having faces engaging the sides of said stirrup, and a bolt passing through and engaging angular walls of an opening in said washer and also passing through said spring and the bottom of said stirrup and casing, a nut screw-threaded to the outer projecting end of said bolt, a cover plate for said casing provided with upwardly projecting flanged portions embracing said stirrup and closing vertical joints between the latter and the ears of the casing, downwardly turned flanges embracing the casing between said ears, and bolts securing the casing and the stirrup to the body and the spring respectively of a vehicle.

6. In a shock-absorber of the character described, the combination of a tubular casing closed at its bottom and having two oppositely disposed grooves formed in its walls, a stirrup sliding vertically in said grooves with its ends projecting above said casing, a volute spring in said casing beneath said stirrup, a volute spring in said casing above and resting on the bottom of said stirrup, a washer resting on the top of said last-named spring and having faces engaging the sides of said stirrup, an angular opening through said washer, a bolt passing therethrough and having shoulders engaging the angular opening in said washer, said bolt also passing through said springs and the bottom of said stirrup and casing, a nut screw-threaded to the outer projecting end of said bolt, and bolts securing the casing and the stirrup to the body and the spring respectively of a vehicle.

7. In a shock-absorber of the character described, the combination of a tubular casing closed at its bottom and having two oppositely disposed grooves formed in its walls, a stirrup sliding vertically in said grooves with its ends projecting above said casing, a volute spring in said casing above and resting on the bottom of said stirrup, a washer resting on the top of said spring, and having faces engaging the sides of said stirrup, a bolt passing through an opening in said washer, means for restraining said bolt from turning in relation to said washer, said bolt also passing through said spring said stirrup and said casing, a nut screw-threaded to the outer projecting end of said bolt, a cover for said casing provided with upwardly projecting guide portions extending along the sides of said stirrup and downwardly turned flanges embracing the casing between the grooved walls, and bolts securing the casing and the stirrup to the body and the spring respectively of a vehicle.

8. In a shock-absorber of the character described, the combination of a tubular casing closed at its bottom and having ears projecting upwardly from its body portion, two oppositely disposed grooves formed in said casing and ears, a stirrup sliding vertically in said grooves with its ends projecting above said casing, a volute spring in said casing above the bottom of said stirrup, a washer resting on the top of said spring and having faces engaging the sides of said stirrup, a bolt passing through said washer said spring and the bottom of said casing, means for restraining said bolt from turning movement, a nut screw-threaded to the outer projecting end of said bolt, a cover plate for said casing provided with upwardly projecting flanged portions embracing said stirrup and closing the vertical joints between the latter and the ears of the casing and downwardly turned flanges embracing the casing between said ears, and bolts securing the casing and the stirrup to the body and the spring respectively of a vehicle.

In testimony whereof I have signed this specification in the presence of two subscribing witnesses.

JOSEPH W. JONES.

Witnesses:
C. A. L. MASSIE,
WILLARD H. HARTING.